United States Patent Office 3,706,708
Patented Dec. 19, 1972

3,706,708
UNIFORMLY DISPERSIBLE INSOLUBLE SULFUR VULCANIZING COMPOSITIONS
James Edward Kearnan, Yorktown Heights, and Robert William Newsbaum, Mahopac, N.Y., assignors to Stauffer Chemical Company, New York, N.Y.
No Drawing. Filed Sept. 28, 1970, Ser. No. 76,282
Int. Cl. C08c 11/54; C08f 27/06
U.S. Cl. 260—79.5                                                16 Claims

ABSTRACT OF THE DISCLOSURE

The dispersibility, in rubber, of insoluble sulfur used for vulcanizing can be improved by admixing alkylphenoxypoly(ethyleneoxy)ethanols with the sulfur.

The present invention relates to improved insoluble sulfur vulcanizing compositions characterized by improved dispersibility in rubber.

BACKGROUND OF THE INVENTION

It is well known that the most important vulcanizing agent for rubber is elementary sulfur. Uniform dispersion of the sulfur in the rubber is a prerequisite for uniform vulcanization and vulcanizates with optimum mechanical properties. However, the solubility of sulfur in the rubber increases as the temperature of the rubber increases. The proportion of sulfur soluble at high mixing temperatures exceeds the proportion soluble at room temperature, thereby forming a supersaturated solution. Upon cooling, the excess sulfur crystallizes and diffuses to the surface and "blooms." Sulfur bloom is disadvantageous as it interferes with or prevents self-adhesion or "natural tack" which enables the multiple rubber forming particles to adhere to each other.

One of the solutions to this problem has been to use "insoluble sulfur." Insoluble sulfur is an amorphous allotrope of sulfur which is basically a metastable linear polymer of sulfur having more than 8 sulfur atoms per polymer chain. The average insoluble sulfur is a high polymer which can have up to 1 million atoms of sulfur per molecule though the average product used in the rubber field has an average molecular weight within the range of 100,000 to 300,000. The insoluble sulfur products used for vulcanizing generally contain above 30% and preferably 60–100% of material which is insoluble in carbon disulfide ($CS_2$). Sulfur that is insoluble in carbon disulfide is also insoluble in rubber. Insoluble sulfur degrades under the influence of heat to form soluble sulfur for vulcanizing.

When insoluble sulfur is properly dispersed in rubber its use causes practically no change in the course of vulcanization or in the properties of the vulcanizates. However, insoluble sulfur is often difficult to uniformly disperse in rubber.

Non-uniform dispersions create excess sulfur deposits on the rubber surface creating an imbalance in cure. In these areas which are supersaturated with sulfur, more sulfur crosslinking than planned is obtained with a tighter cure and decreased elongation. In products subject to the strain of flexing, this tighter cure may be the cause of premature cracking under stress because the overcured areas are not as extensible as the internal or normally cured parts of the piece. The total use of the sulfur for vulcanization provides a stronger overall product.

Further, yellowish-brown stains appear on the surface where excess sulfur has formed. This type of staining downgrades white and pale colored stocks such as used for white sidewall tires and light colored household articles. The discoloration is a blemish and results in a loss to the processor.

The use of rubber oils in an amount of about 20% in combination with the insoluble sulfur has greatly improved the uniform dispersibility of the sulfur though the oil's main function is to reduce the dusting of the sulfur. However, it is extremely difficult to find oils which will accomplish this task without affecting the stability of the insoluble sulfur, e.g., cause it to degrade to soluble sulfur.

It has now been found that the dispersibility of the insoluble sulfur can be greatly improved by admixing the insoluble sulfur with a dispersing aid in the form of a specific group of alkylphenoxypoly(ethyleneoxy)ethanol compounds represented by the formula:

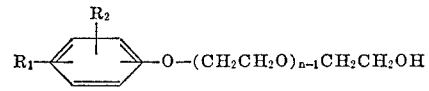

wherein $R_1$ is an alkyl group of 4–20 carbons and $R_2$ is hydrogen or a $C_4$–$C_{20}$ alkyl group. Preferably the alkyl groups of $R_1$ and $R_2$ are $C_6$–$C_{12}$. More preferably, $R_2$ is hydrogen and $R_1$ is a $C_8$–$C_{12}$ alkyl and most preferably octyl or nonyl. The alkyl groups can be either linear or branched but are preferably branched. The letter $n$ denotes the average number of moles of ethylene oxide per mole of alkylphenol used to form the compounds and $n-1$ equals the average number of repeating ethyleneoxy groups. The number $n$ is preferably 4 to 100 and most preferably 9–20.

The dispersing aid is preferably used in an amount ranging from as low as 0.3% to about 5%, by weight, based on the weight of the insoluble sulfur (insoluble sulfur fraction plus soluble sulfur). Preferred range for maximum dispersion of insoluble sulfur alone is obtained using from about 0.5% to about 1%, by weight of the dispersing aid. Oil treated insoluble sulfur requires similar amounts.

The dispersing aids which can be used in the present invention can be illustrated by the compounds in the table below:

TABLE I

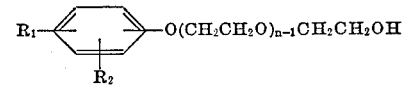

| $R_1$ | $R_2$ | n(Average) | Percent ethylene oxide |
|---|---|---|---|
| $C_4H_9$ | H | (8–10) | |
| $C_5H_{11}$ | H | (8–10) | |
| $C_6H_{13}$ | H | (8–10) | |
| $C_7H_{15}$ | H | (8–10) | |
| $C_8H_{17}$ | H | 7 | 62 |
| $C_8H_{17}$ | H | 9 | 65 |
| $C_8H_{17}$ | H | 12.5 | 70 |
| $C_8H_{17}$ | H | 13 | 73 |
| $C_9H_{19}$ | H | 4 | 44 |
| $C_9H_{19}$ | H | 6 | 54 |
| $C_9H_{19}$ | H | 8–9 | 61 |
| $C_9H_{19}$ | H | 9 | 65 |
| $C_9H_{19}$ | H | 10–11 | 68 |
| $C_9H_{19}$ | H | 15 | 75 |
| $C_9H_{19}$ | H | 20 | 80 |
| $C_9H_{19}$ | H | 30 | 86 |
| $C_9H_{19}$ | H | 40 | 89 |
| $C_9H_{19}$ | H | 50 | 91 |
| $C_9H_{19}$ | H | 100 | 95 |
| $C_{12}H_{25}$ | H | 6 | |
| $C_{12}H_{25}$ | H | 9 | |
| $C_{12}H_{25}$ | H | 10.3 | |
| $C_{16}H_{33}$ | H | (8–10) | |
| $C_{18}H_{37}$ | H | (10–12) | |
| $C_{20}H_{41}$ | H | (12–14) | |
| $C_9H_{19}$ | $C_9H_{19}$ | 10–11 | |
| $C_9H_{19}$ | $C_9H_{19}$ | 50 | |

These are given as illustrative and the invention is not intended to be limited thereto.

The insoluble sulfur usable in the present invention can be prepared by heating liquid sulfur to a temperature between 320° F. and 370° F. to form sulfur mu. The sulfur mu is quenched in water to produce a mass of soluble and insoluble sulfur. The soluble sulfur can be totally or partially extracted with carbon disulfide leaving a high proportion (60–100%) of insoluble sulfur. Other methods for preparing insoluble sulfur include quenching sulfur vapor in carbon disulfide (U.S. Pats. 2,419,310 and 2,419,309). Processes for preparing insoluble sulfur in a stabilized form include those set forth in U.S. Pats. 2,419,324, 2,460,365, 2,462,146. Flowers of sulfur which is a sublimed sulfur containing 30% insoluble sulfur can also be used. Insoluble sulfur obtained from any of these processes can be utilized in the present invention. As used herein the term insoluble sulfur is broadly intended to include those compositions having a high proportion of insoluble sulfur per se and up to about 70%, by weight, soluble sulfur. Preferably, the insoluble sulfur contains at least 60% sulfur which is insoluble in $CS_2$ and more preferably from 85–100% of such material.

Also included within the term insoluble sulfur are the oil treated insoluble sulfurs. Generally a rubber processing oil in an amount of 10–40% is used to control dusting. Oils are chosen on the basis of their effect on the stability of the insoluble sulfur and on dispersibility properties. Naphthenic and paraffinic oil has been found by the prior art to be generally effective. Other oils generally in use by the prior art can also be used in the present invention.

It is also to be pointed out that oils of the same type from different sources may vary as to degree of dispersibility of the insoluble sulfur. The dispersing aid can be used to control and make more uniform the dispersibility of oils having less than desirable dispersibility properties.

The compositions of the present invention can be prepared by simply mixing the dispersing aid with the insoluble sulfur using mild agitation at room temperature. Preferably, and because of the small amount, dilution or solvation of the dispersing aid in a small amount of solvent is desirable. It has, however, been found that better results are obtained when the dispersing aid is first dissolved in a large amount of a solvent such as carbon disulfide followed by adding the insoluble sulfur to the so formed solution. The solvent, e.g., the carbon disulfide, is then evaporated to leave the desired vulcanization agent. Any low boiling solvent which can solvate the wetting agent without adversely affecting the sulfur can be used. The dispersing aid can also be applied by spraying (molten in the case of solid dispersing aid) or any other technique to affect the same end.

The compositions of the present invention can be used to vulcanize rubber wherever sulfur and insoluble sulfur are now used. The rubber which can be vulcanized can be defined as an unsaturated hydrocarbon elastomer requiring a sulfur cure. These materials can be illustrated by natural rubber, SBR (styrene-butadiene), butadiene, acrylonitrile, EPDM (ethylene-propylene diene monomer), and the like. Other ingredients normally found in rubber blends can also be included such as antioxidants, processing aids, buffers, fillers, pigments, accelerators and the like.

The present invention is directed to a method for preparing a more uniformly dispersible insoluble sulfur composition which can be used in the vulcanization of both natural and synthetic rubber. The composition of the insoluble sulfur and the dispersing aid can be utilized as an effective vulcanization aid for rubber.

The present invention will be more fully illustrated in the examples which follow.

EXAMPLES

Preparation of sulfur/dispersing aid composition

Procedure A.—"Insoluble sulfur" is mixed under mild agitation at room temperature with an amount of dispersing aid sufficient to give the required percentage of dispersing aid, by weight, based on the weight of sulfur. A 90% insoluble sulfur was used in the examples.

Procedure B.—The required amount of dispersing aid was dissolved in carbon disulfide ($CS_2$). Equal weight proportions of the $CS_2$ dispersing aid mixture and insoluble sulfur were admixed together to form a slurry. The $CS_2$ was then evaporated at room temperature.

The sulfur material prepared by the above procedures were tested using a natural rubber master batch of the following relative composition:

TABLE II.—RUBBER MASTER BATCH

| | Amount in parts/hundred parts rubber hydrocarbons |
|---|---|
| Natural rubber | 100.0 |
| Antioxidant (mixed aryl phenols) | 1.0 |
| Stearic acid | 2.0 |
| Zinc oxide | 5.0 |
| Titanium dioxide | 20.0 |
| Hydrated aluminum silicate | 16.0 |
| Zinc salt of dimethyldithiocarbamate | 0.1 |
| 2,2'-dithiobisbenzothiazole | 1.0 |

The ingredients of the master batch were preblended and then a quantity of master batch sufficient to provide 200 grams rubber hydrocarbon was milled at 224° F. on a heated two roll mill for four minutes. An amount of vulcanization agent equivalent to 3 parts per 100 parts of rubber hydrocarbon (6 grams) of insoluble sulfur was then sprinkled on the rubber on the mill and the sample was milled for an additional 2 minutes. A milled sheet of approximately 0.085 of an inch was removed from the mill. After approximately 24 hours, an 80 gram panel was cut from the original sheet (which weighed approximately 300 grams) to form a panel slightly less than 6″ x 6″. This panel was pressure cured in an electrically heated mold for 30 minutes at 290° F. to provide a white, 6″ x 6″ test panel. Uniformity of sulfur dispersion is observed by counting the number of sufur or yellowish-brown stains (number visible sulfur particles, unmagnified) which appear on the surface of the test panel. The following results were obtained:

TABLE III

| Example | Additive | n[1] | Mix procedure | Percent additive[2] | Number of particles[3] |
|---|---|---|---|---|---|
| 1 | Octylphenoxypoly(ethyleneoxy)ethanol. | (5) | A | 1.0 | 27 |
| 2 | Nonylphenoxypoly(ethyleneoxy)ethanol. | 4 | A | 1.0 | 24 |
| 3 | do | 6 | A | 1.0 | 11 |
| 4 | do | (5) | B | 1.0 | 9 |
| 5 | do | 4 | B | 1.0 | 16 |
| 6 | do | 6 | B | 1.0 | 2 |
| 7 | do | 9 | B | 0.3 | 22 |
| 8 | do | 9 | B | 0.4 | 25 |
| 9 | do | 9 | B | 0.6 | 16 |
| 10 | do | 9 | B | 0.7 | 16 |
| 11 | do | 9 | B | 0.8 | 2 |
| 12 | | | | 0.0 | 70 |

[1] n = average number of moles of ethylene oxide per mole of hydrophobe
[2] Percent additive is based on the weight of the insoluble sulfur vulcanizer.
[3] Number of visible surface discolorations.

Regular insoluble sulfur showed an average of 70 sulfur stains. Significant reductions in the number of stains are obtained using the dispersion aids. Better results are also shown using the solvent mixing procedure B in preparing the insoluble sulfur.

Oil treated insoluble sulfur also shows an improvement in dispersibility when alkylphenoxypoly(ethyleneoxy) ethanol dispersing aids are added thereto. Samples are prepared by blending the dispersing aid with the sulfur under mild agitation followed by blending in the oil. The results utilizing two different oils in the rubber master batch of Table II are shown in Tables IV and V.

TABLE IV

[Additive: Nonylphenoxypoly(ethyleneoxy)ethanol. Oil: Naphthenic oil]

| Example | n [1] | Percent additive [2] | Percent oil [3] | Number of particles [4] |
|---|---|---|---|---|
| 13 | 9 | 0.5 | 0 | 0 |
| 14 | 9 | 1.0 | 0 | 0 |
| 15 | 9 | 0.5 | 10 | 1 |
| 16 | 9 | 0.5 | 20 | 4 |
| 17 | 9 | 1.0 | 10 | 3 |
| 18 | 9 | 1.0 | 20 | 7 |
| 19 | 20 | 0.5 | 0 | 1 |
| 20 | 20 | 1.0 | 0 | 0 |
| 21 | 20 | 0.5 | 10 | 0 |
| 22 | 20 | 0.5 | 20 | 2 |
| 23 | 20 | 1.0 | 10 | 0 |
| 24 | 20 | 1.0 | 20 | 0 |
| 25 (control) | | | 10 | 31 |
| 26 (control) | | | 20 | 12 |

[1] n=Average number of moles of ethylene oxide per mole of hydrophobe.
[2] Percent additive is based on the weight of the insoluble sulfur valcanizer.
[3] Percent oil is based on the weight of the insoluble sulfur vulcanizer.
[4] Number of visible surface discolorations.

TABLE V

[Additive: Nonylphenoxypoly(ethyleneoxy)ethanol. Oil: Hydrogenated naphthenic oil]

| Example | n [1] | Percent additive [2] | Percent oil [3] | Number of particles [4] |
|---|---|---|---|---|
| 27 | 9 | 0.5 | | 0 |
| 28 | 9 | 1 0 | | 0 |
| 29 | 9 | 0 5 | 10 | 4 |
| 30 | 9 | 0 5 | 20 | 6 |
| 31 | 9 | 1.0 | 10 | 3 |
| 32 | 9 | 1.0 | 20 | 1 |
| 33 | 20 | 0.5 | | 1 |
| 34 | 20 | 1.0 | | 0 |
| 35 | 20 | 0.5 | 10 | 5 |
| 36 | 20 | 0.5 | 20 | 3 |
| 37 | 20 | 1.0 | 10 | 0 |
| 38 | 20 | 1.0 | 20 | 1 |
| 39 (control) | | | 10 | 29 |
| 40 (control) | | | 20 | 10 |

[1] n=Average number of moles of ethylene oxide per mole of hydrophobe.
[2] Percent additive based on the weight of the insoluble sulfur vulacnizer.
[3] Percent oil is based on the weight of the insoluble sulfur vulcanizer.
[4] Number of visible surface discolorations.

As can be seen, the oil treated sulfur alone of Tables IV and V at the 10% level has respectively 31 and 29 visible surface discolorations. At 20% the number of discolorations has decreased to 12 and 10 respectively. Addition of the dispersing aid substantially reduces and in some cases eliminates the number of visible surface discolorations.

It is also shown that dispersing aid at a level of 0.5% is extremely effective in reducing the number of visible surface discolorations.

Similar results can be obtained using as dispersing aids in the preceding examples the following materials:

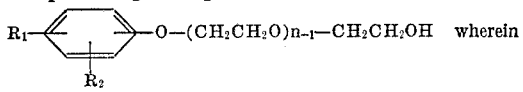

wherein

| $R_1$ | $R_2$ | Average mole ratio ethylene oxide (n) | Percent ethylene oxide |
|---|---|---|---|
| $C_8H_{17}$ | H | 5 | |
| $C_8H_{17}$ | H | 7 | 62 |
| $C_8H_{17}$ | H | 9 | 65 |
| $C_8H_{17}$ | H | 12.5 | 70 |
| $C_8H_{17}$ | H | 13 | 73 |
| $C_9H_{19}$ | H | 4 | 44 |
| $C_9H_{19}$ | H | 6 | 54 |
| $C_9H_{19}$ | H | 8-9 | 61 |
| $C_9H_{19}$ | H | 9 | 65 |
| $C_9H_{19}$ | H | 10-11 | 68 |
| $C_9H_{19}$ | H | 15 | 75 |
| $C_9H_{19}$ | H | 20 | 80 |
| $C_9H_{19}$ | H | 30 | 86 |
| $C_9H_{19}$ | H | 40 | 89 |
| $C_9H_{19}$ | H | 50 | 91 |
| $C_9H_{19}$ | H | 100 | 95 |
| $C_{12}H_{25}$ | H | 6 | |
| $C_{12}H_{25}$ | H | 9 | |
| $C_{12}H_{25}$ | H | 10.3 | |
| $C_9H_{19}$ | $C_9H_{19}$ | 6 | |
| $C_9H_{19}$ | $C_9H_{19}$ | 10-11 | |
| $C_9H_{19}$ | $C_9H_{19}$ | 50 | |

The vulcanized rubber products prepared using the compositions of the present invention can be used in any area where such rubber products are normally used such as tires, and other rubber products such as conveyor belts, hose and any plied rubber article where insoluble sulfur is normally used.

The invention is defined in the claims which follow.

What is claimed is:

1. In a method for vulcanizing rubber with insoluble sulfur containing up to about 70%, by weight, soluble sulfur the improvement which comprises pretreating the sulfur with from about 0.3% to about 5%, by weight, based on the total weight of the sulfur, of a dispersing aid of the formula:

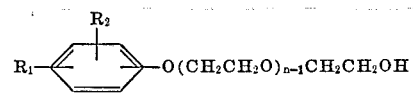

wherein $R_1$ is a $C_4$ to $C_{20}$ alkyl group, $R_2$ is a hydrogen or a $C_4$–$C_{20}$ alkyl group and $n$ denotes a number from 4 to 100 prior to admixing the sulfur with the rubber in order to improve the dispersibility of the sulfur in the rubber and prevent sulfur bloom.

2. The method as recited in claim 1 wherein said pretreatment is accomplished by preparing a slurry of said sulfur and said dispersing aid in a solvent for said dispersing aid which solvent does not affect the stability of said insoluble sulfur, followed by evaporating said solvent.

3. The method as recited in claim 2 wherein said solvent is carbon disulfide.

4. The method as recited in claim 1 wherein $R_1$ is a $C_8$–$C_{12}$ alkyl and $R_2$ is hydrogen.

5. The method as recited in claim 4 wherein said $R_1$ group is a $C_8$ alkyl group.

6. The method as recited in claim 4 wherein said $R_1$ group is a $C_9$ alkyl group.

7. The method as recited in claim 1 wherein $n$ is a number of from 9–20.

8. An improved vulcanizing sulfur composition characterized by improved dispersibility in rubber consisting essentially of insoluble sulfur containing at least about 60%, by weight, insoluble sulfur, the remainder being soluble sulfur, and from about 0.3% to about 5%, by weight, based on the total sulfur weight, of a dispersing aid of the formula:

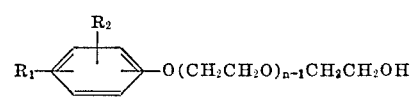

wherein $R_1$ is a $C_4$–$C_{20}$ alkyl group, $R_2$ is hydrogen or a $C_4$–$C_{20}$ alkyl group, and $n$ denotes a number from 4 to 100.

9. The composition of claim 8 wherein $R_1$ is a $C_8$–$C_{12}$ alkyl and $R_2$ is hydrogen.

10. The composition of claim 9 wherein $R_1$ is a $C_8$ alkyl.

11. The composition of claim 9 wherein $R_1$ is a $C_9$ alkyl.

12. The composition of claim 8 wherein $n$ is a number from 9 to 20.

13. The composition of claim 8 wherein said dispersing aid is used in an amount of from about 0.5% to about 1%, by weight.

14. The method of claim 1 wherein said sulfur contains at least about 60% insoluble sulfur.

15. The method of claim 1 wherein said sulfur contains at least about 85% insoluble sulfur.

16. The composition of claim 8 wherein said sulfur contains at least about 85% insoluble sulfur.

References Cited

UNITED STATES PATENTS 2,213,477  9/1940  Steindorff et al. _____ 260—6 BB
2,348,736  5/1944  Heath _____ 23—244 X

FOREIGN PATENTS 505,769  7/1939  Great Britain.

OTHER REFERENCES

Chemical Dictionary, Sixth Ed. (1961), p. 219.

JOHN D. WELSH, Primary Examiner

U.S. Cl. X.R.

252—182, 363.5, 309